United States Patent Office 2,933,450
Patented Apr. 19, 1960

2,933,450

HEAT-EXCHANGE FLUID COMPOSITIONS

Arthur R. Lyding, New Haven, Conn., assignor to Olin Mathieson Chemical Corporation, New Haven, Conn., a corporation of Virginia No Drawing. Application July 18, 1956
Serial No. 598,541

1 Claim. (Cl. 252—73)

This invention relates to heat-transfer fluids and has for its object the provision of an improved fluid composition, and a process of circulating the fluid composition in heat-exchange contact with surfaces from which heat is exchanged. More particularly, the invention provides a mixture of isomers that have chemical and physical properties giving it marked advantages for the purpose of the invention.

Properties desirable in media relied upon for efficient and substantially trouble-free heat-transfer uses include high boiling point, low freezing point, low viscosity, maximum stability, i.e. resistance to decomposition on being subjected to high temperatures, nuclear radiation or other potentially destructive environmental factors, and a narrow range of boiling point temperatures. The latter feature characterizes liquids which can be partially vaporized with only slight changes in composition and which will therefore not be subject to fractionation when used for heat-transfer purposes, thus approximating the behavior of azeotropic compositions.

The heat-transfer fluid compositions of the invention comprise a mixture of the isomers of aryl-alkarylmethanes or di-alkarylmethanes which are characterized by having a low freezing point, a high boiling point, and practically the behavior of azeotropic compositions on distillation. Advantageously, the heat-transfer mixtures of the invention are isomeric hydrocarbons in proportions resulting from conversion of an alkyl-aromatic starting material.

The mixture of isomers of aryl-alkarylmethanes or di-alkarylmethanes of the invention may be represented by the formula A—CH₂—A', wherein A represents an aryl or alkaryl group consisting of phenyl, mono- or di-methylphenyl, -ethylphenyl, -propylphenyl, -butylphenyl and -amylphenyl, and A' represents an alkaryl group selected from the group consisting of mono- or di-methylphenyl, -ethylphenyl, -propylphenyl, -butylphenyl and -amylphenyl. Suitable mixtures of isomers are readily prepared in satisfactory yields by condensing a suitable alkylaromatic hydrocarbon or mixture of hydrocarbons with formaldehyde in the presence of acid.

While, as indicated, any alkylated benzene including one or two nuclear alkyl groups containing 1 to 5 carbon atoms is useful for the purpose, the preferred mixtures are those resulting from starting aromatic compounds containing at least one methyl substituent.

Thus, when toluene is condensed with formaldehyde, the resulting product consists of about 70% of the ortho-para isomer:

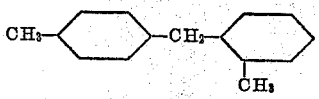

and about 30% of the para-para' isomer:

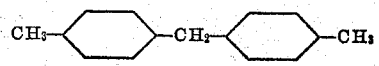

The following example is an illustrative embodiment of a convenient synthesis of the above mixture of isomers.

EXAMPLE I

*Preparation of ditolylmethanes*

In a one liter, three-necked flask equipped with stirrer, condenser, dropping funnel and thermometer was placed 15.4 grams of water. While stirring, 75 grams (0.73 mole) of 94–96% sulfuric acid and then 100 grams (1.09 moles) of toluene were added and the mixture was brought to 95–100° C. At this point, the dropwise addition of 19.7 grams of 36–38% formalin (0.242 mole based on 37% concentration) was started and continued over a two hour period while keeping the temperature at 95–100° C. When the addition of formalin was complete, the mixture was stirred two hours longer at 95–100° C.

After standing overnight, the oil layer was decanted from the semi-solid aqueous phase and the former was washed with three 35 ml. portions of an aqueous 7% sodium carbonate solution. The oil layer was then washed with water and distilled. Toluene was first removed under vacuum of 40–60 mm, and then 37.5 grams (80% of theoretical yield) of mixed ditolylmethanes was distilled at 85–88° C. and at a pressure of 0.3 mm. of mercury. The product was obtained as a colorless liquid, $N_d^{26}=1.5644$. That this product is a mixture of p,p'-ditolylmethanes and o,p'-ditolylmethanes has been shown by oxidizing products from the above reaction and separating the isomeric benzophenone dicarboxylic acids. The latter were found to be formed as the o,p'- and p,p'-isomers in the ratio of about 70:30 respectively. Secondly, pure p,p'-ditolylmethane has been prepared by the catalytic reduction of p,p'-ditolylketone and the former was found to have a melting point of 28° C. and a refractive index of $N_d^{26}=1.5593$. The mixed ditolylmethanes from the reaction of toluene and formalin previously described had a congealing temperature of −3 to −9° C. which further illustrates that it is a mixture of the isomers with a low melting point.

Investigations of the above reaction including varying the essential conditions such as time, temperature, proportions and concentrations of acid, carrying out the reaction in methanol instead of water, and use of an emulsifying agent were made and showed that the isomeric composition of the product was essential unchanged.

The 70:30 mixture of isomers has been found to be effective for use as heat-transfer fluid particularly because of the low freezing point and substantial absence of fractionation when vaporized. For purposes of illustration, the following table lists the important properties of an eutectic mixture of diphenyl and diphenyloxide, a widely used heat-transfer fluid, and the unseparated mixture of ditolylmethanes obtained by reacting toluene with formaldehyde.

TABLE I

| | A | B |
|---|---|---|
| Composition | 26.5% Diphenyl / 73.5% Diphenyloxide | 30% p,p'-ditolylmethane. / 70% o,p'-ditolylmethane. |
| Boiling Point at 760 mm. | 495.8° F | 552.2° F. |
| Melting Point | 53.2° F | 23° F. |

In using a mixture of materials such as above for a heat exchange fluid it is desirable that the composite should not separate into its components by distillation since the vapor pressure and freezing point properties would change if fractional distillation during operation caused the composition to change. The mixture B, above, does not change in composition when distilled.

While the ditolylmethanes and other dialkylmethanes may be made by other known methods, the foregoing offers among other advantages the production of a mixture of isomers in proportions highly suitable for use as a heat-transfer fluid.

The following example illustrates the preparation of an isomeric mixture of dicumylmethanes, as disclosed and claimed in applicant's copending application Serial Number 708,750, filed January 14, 1958, highly suitable as a heat-transfer fluid.

EXAMPLE II

*Preparation of isomeric mixture of dicumylmethane*

30 g. of methanol and 190 g. of concentrated sulfuric acid were mixed in a one liter, three-necked flask while controlling the temperature below 20° C. The flask was equipped with stirrer, condenser and dropping funnel. 125 g. of cumene (1.04 moles) was added and finally 20.3 g. of formalin (36.4%, 0.245 mole) was added over a two hour period while controlling the temperature between 35 and 40° C. The reaction mixture was then stirred for an additional two hours at the same temperature. The mixture was transfered to a separatory funnel and allowed to separate overnight. The organic layer was washed with three 45 ml. portions of 7% sodium carbonate and then with three 50 ml. portions of water. The organic layer was dried over $K_2CO_3$ and filtered.

The liquid was distilled. Unchanged cumene, weighing 49 grams was recovered at 65° C./.30 mm. An intermediate cut was obtained which boiled between 126 and 128° C. at a pressure of 0.5 mm. of mercury ($N_d^{26}$=1.5421) and weighed 4.3 grams. The product, weighing 36.5 grams then distilled at 128 to 132° C. at a pressure of 0.5 mm. mercury ($N_d^{26}$=1.5412). As the intermediate cut had a refractive index so close to that of the product, they were considered identical and the yield was thus calculated to be 66% of the theoretical.

Analysis of a heart cut gave C=90.03% and H=9.80%.

Theory requires C=90.42% and H=9.59%.

The congealing temperature of the mixture was found to be about —40° C.

Other dialkarylmethanes in the form of isomeric mixtures well adapted for use as heat-transfer fluids may be prepared by the same general reaction. Likewise, the condensation reaction with formaldehyde to form isomeric mixtures of aryl-alkarylmethanes or dialkarylmethanes may be applied to a mixture of starting reagents such as benzene and toluene, toluene and ortho-, meta-, or para-xylene or mixed xylenes, benzene and a xylene or mixed xylenes, to produce isomeric mixtures of low freezing point and high boiling point well adapted for use as heat-transfer fluids in accordance with this invention. It will also be understood that under particular circumstances, the aryl-alkarylmethanes or dialkarylmethane heat-transfer fluids of this invention may be mixed with minor proportions of known fluids such as diphenyl and diphenyloxide.

In carrying out a process of the invention, the mixture of isomers, for example, the mixture prepared according to Example I, is circulated by means of a pump through a duct system in heat-exchange contact with an apparatus from which heat is to be removed, for example, a chemical reactor, and then into heat-exchange contact with another apparatus, for example, another reactor operated at a lower temperature to which heat is added. The mixture of isomers may be used to transfer heat in systems used to heat buildings in the manner of circulated water systems.

I claim:

The process of transferring heat from a body of one temperature to another body at a different temperature which comprises circulating in heat-exchange contact first with one body and then in heat-exchange with the other body a mixture of monomeric isomers represented by the general formula: A—$CH_2$—A' wherein A represents a radical of the group consisting of phenyl, monoalkylphenyl and dialkylphenyl, the said alkyl containing 1 to 5 carbon atoms, and A' represents a radical of the group consisting of monoalkylphenyl and dialkylphenyl, the said alkyl containing 1 to 5 carbon atoms, said mixture of isomers having a boiling point at normal atmospheric pressure of at least about 290° C. and having a congealing temperature below 0° C.

References Cited in the file of this patent

UNITED STATES PATENTS

| 2,000,886 | Dow | May 7, 1935 |
| 2,172,391 | Krase | Sept. 12, 1939 |
| 2,660,572 | Feasley | Nov. 24, 1953 |

FOREIGN PATENTS

| 354,886 | Great Britain | Aug. 20, 1931 |